(12) United States Patent
Bonnet

(10) Patent No.: US 6,273,241 B1
(45) Date of Patent: Aug. 14, 2001

(54) POWERED CONVEYOR TURN HAVING IMPROVED REPAIR FEATURES

(75) Inventor: Henri Bonnet, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/272,079

(22) Filed: Mar. 18, 1999

(51) Int. Cl.$^7$ .................................................. B65G 13/07
(52) U.S. Cl. ...................... 198/790; 198/781.09; 198/787
(58) Field of Search .................. 198/781.03, 781.09, 198/787, 790, 791

(56) References Cited

U.S. PATENT DOCUMENTS

| | | |
|---|---|---|
| 100,710 | 3/1870 | Bachelder . |
| 445,290 | 1/1891 | Treat . |
| 982,920 | 1/1911 | Aab . |
| 1,114,621 | 10/1914 | Lewis . |
| 1,737,829 | 12/1929 | Cosgrove . |
| 1,744,914 | 1/1930 | Moore . |
| 1,756,653 | 4/1930 | McArthur . |
| 1,959,157 | 5/1934 | Eggleston . |
| 2,594,591 | 4/1952 | Runton . |
| 2,622,720 | 12/1952 | Lorig . |
| 2,683,523 | 7/1954 | Rottersmann . |
| 3,189,161 | 6/1965 | Schneider et al. . |
| 3,337,023 | 8/1967 | Kohl et al. . |
| 3,369,646 | 2/1968 | Musser . |
| 3,724,643 | 4/1973 | Kohl . |
| 3,945,413 | 3/1976 | Eriksson . |
| 4,227,610 | 10/1980 | Gerdes et al. . |
| 4,372,442 | * 2/1983 | Fleischauer ........................ 198/790 |
| 4,485,913 | 12/1984 | Treiber . |
| 4,513,859 | 4/1985 | Long et al. . |
| 4,583,637 | 4/1986 | Ferguson . |
| 4,620,628 | 11/1986 | Greenlee . |
| 4,685,556 | 8/1987 | Joseph . |
| 4,759,434 | 7/1988 | Dorner . |
| 5,040,669 | 8/1991 | Blöcker . |
| 5,107,982 | 4/1992 | Walter . |
| 5,316,131 | 5/1994 | Bonnet . |
| 5,531,311 | * 7/1996 | LeMay et al. ........................ 198/448 |
| 5,649,617 | * 7/1997 | Fortenbery et al. ............ 198/781.03 |
| 5,657,854 | 8/1997 | Chen et al. . |

* cited by examiner

Primary Examiner—Christopher P. Ellis
Assistant Examiner—Joe Dillon, Jr.
(74) Attorney, Agent, or Firm—Alston & Bird LLP

(57) ABSTRACT

A power turn conveying apparatus and method of using same is provided which includes the use of a drive belt that extends in a horizontal plane and engages drive pulleys that rotate about vertical axes and are connected by 90 degree gear boxes to horizontally extending conveyor rollers. The drive belt cooperates with the drive pulleys and gearboxes to hold the conveyor rollers to the conveyor frame while the drive belt is tensioned, and easy removal of the conveyor roller assemblies is allowed while the drive belt is untensioned. Receptacles that receive the gearboxes and bearings at the opposite ends of the conveyor rollers extend vertically and define upwardly oriented openings, so that when the drive belt is untensioned the conveyor roller assemblies can be vertically lifted from or vertically dropped into their respective positions in the conveyor system.

32 Claims, 10 Drawing Sheets

POWERED CONVEYOR TURN HAVING IMPROVED REPAIR FEATURES

TECHNICAL FIELD

The present invention generally relates to conveying systems, and particularly relates to a power turn conveyor apparatus, and method of using same.

BACKGROUND OF THE INVENTION

It is well known in the art to provide conveying systems and methods for operating such systems. Generally described, conveying apparatuses are configured to convey packages, parcels, or other items from location from the other.

One portion of such conveying systems typically includes the use of a "power turn" conveyor. A power turn conveyor is a conveyor segment which transfers packages along a path having a 90 degree turn, while maintaining a conveying force to the underside of the conveyor by use of powered conveyor rollers or similar means situated along the path of the power turn conveyor.

Such power turn conveyor configurations often are complex and difficult to service in a time-efficient manner. As may be understood, it is often necessary to rapidly repair or otherwise change rollers within such powered turn conveyors, and such repair can often result in undesirable down time which reduces efficiency of the overall conveying apparatus.

Therefore, a need exists in the art for a power turn conveyor apparatus which is easy to set up, maintain, and service, which requires the minimum of "down time" should repairs be needed while the conveyor apparatus is in service.

SUMMARY OF THE INVENTION

The present invention overcomes deficiencies in the prior art by providing an improved conveyor system which provides a power turn section which can be quickly and easily serviced with a minimum of downtime.

Therefore it is an object of the present invention to provide an improved conveying apparatus.

It is a further object of the present invention to provide an improved power turn conveying apparatus.

It is a further object of the present invention to provide an improved power turn conveying apparatus which is easy to service.

It is a further object of the present invention to provide an improved power turn conveying apparatus which can be serviced relatively quickly with a minimum of downtime.

It is a further object of the present invention to provide an improved power turn conveying apparatus which is economical to service.

It is a further object of the present invention to provide an improved power turn conveying apparatus which is economical to manufacture.

It is a further object of the present invention to provide an improved power turn conveying apparatus which is economical to operate.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Figure 1:
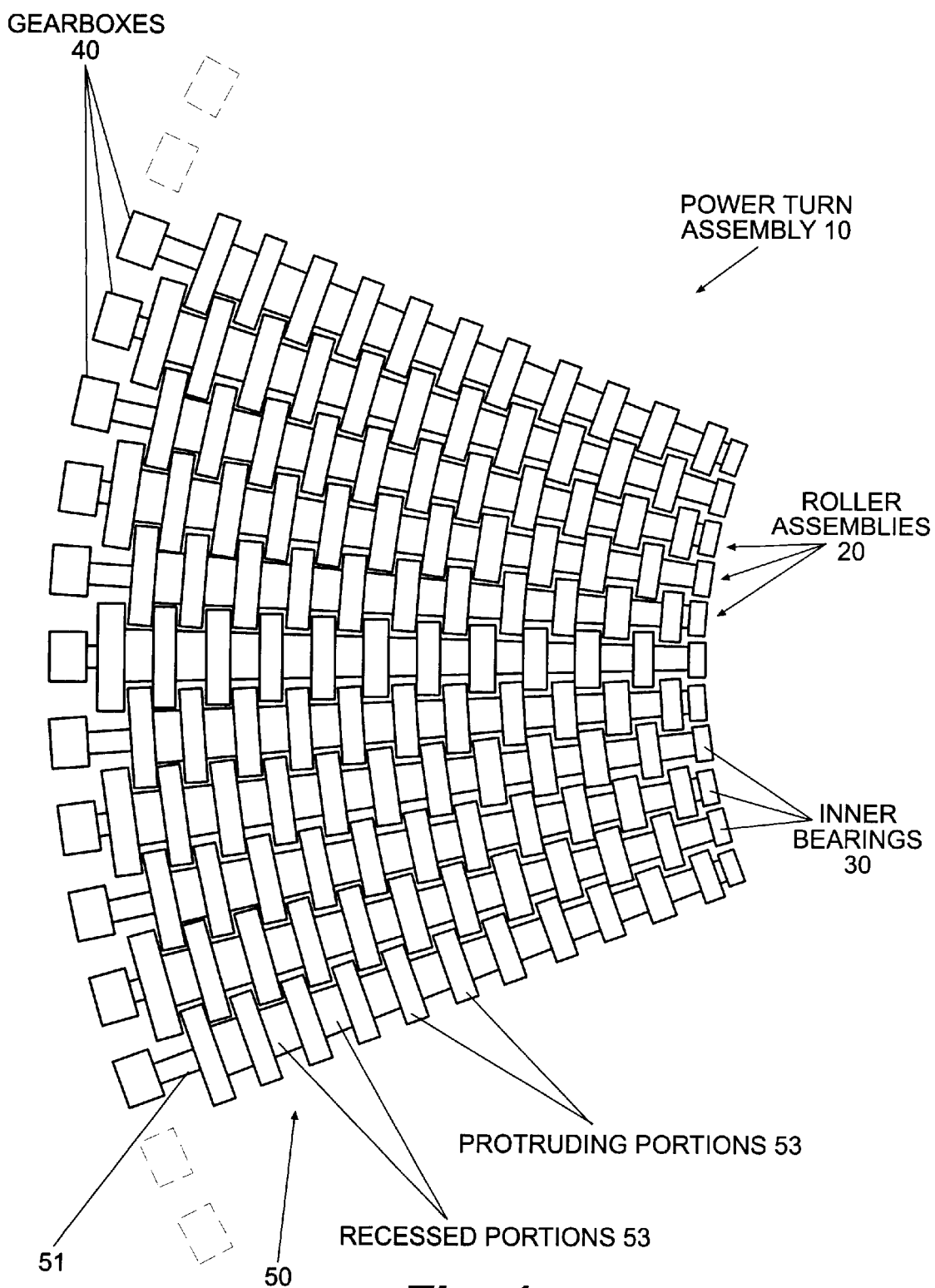
FIG. 1 is a top, illustrative, view of a portion of the power turn assembly 10 according to the present invention, which includes a plurality of roller assemblies 20, each of which includes an inner bearing 30, a gearbox 40, and a roller 50. Each roller member 50 includes an elongate shaft 51, a plurality of protruding portions 52, and a plurality of recessed portions 53 intermediate and alternating between the protruding portions. It should be understood that only a portion of the power turn assembly 10 is shown in FIG. 1, in fact, one preferred power turn assembly according to the present invention is configured to move packages through a substantially complete "90 degree" path, such as generally shown also in FIG. 6.

Reference is now made to the drawings, in which like numerals indicate like elements throughout the several views.

First Embodiment—General Construction and Operation

Reference is generally made to FIGS. 1–5 in describing the general construction of a first embodiment of the present invention. The invention includes a powered conveyor turn system 10 that can be easily repaired because conveyor roller assemblies 20 can be easily and quickly removed from and installed to the conveyor system. This is enabled through the use of a drive belt 80 that lies substantially within a horizontal plane (parallel and beneath the conveying plane). This cogged drive belt 80 engages conveyor roller drive pulleys 42R, 42S, in a serpentine manner with the cogged side of the drive belt engaging the ribbed pulleys 42R and the smooth side of the belt engaging the smooth pulleys. The conveyor roller drive pulleys are rotatably driven about coparallel vertical axes, and are each connected by right-angle degree gear boxes 40 to corresponding horizontally extending conveyor roller assemblies 20.

The drive belt 80 cooperates with the conveyor roller drive pulleys 42R, 42S and gearboxes to hold the conveyor rollers to the conveyor frame while the drive belt is tensioned, and easy removal of the conveyor roller assemblies 20 is allowed while the drive belt 80 is untensioned. Furthermore, the frame 15 of the conveyor system is provided with receptacles that receive the gearboxes and bearings at the opposite ends of the conveyor rollers. These receptacles extend vertically and define upwardly oriented openings, so that when the drive belt is untensioned, the conveyor roller assemblies can be vertically lifted from or vertically dropped into their respective positions in the conveyor system, without requiring removal or significant manipulation of the drive belt.

The Roller Assemblies

Figure 2:
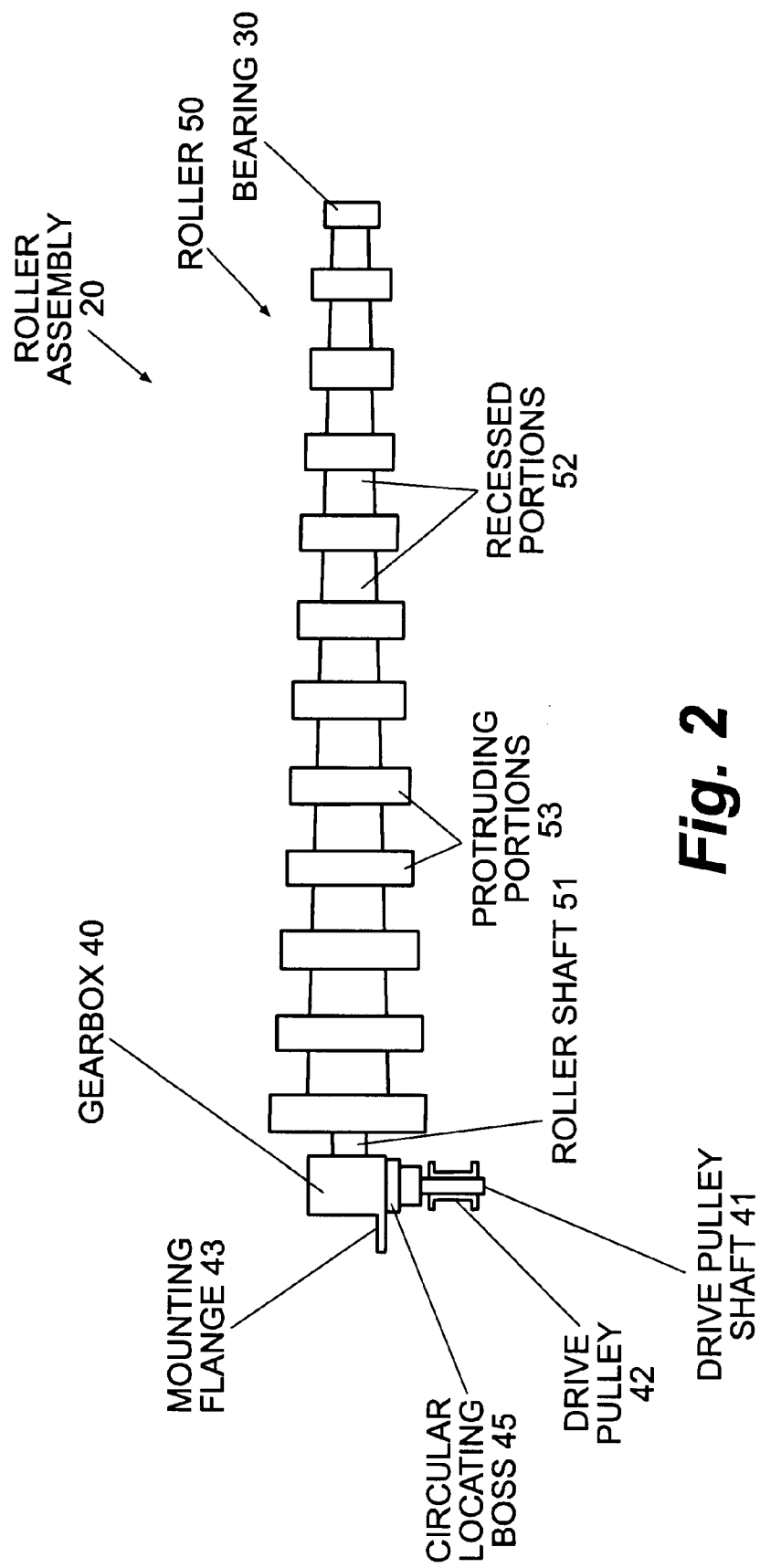
FIG. 2 is an isolated side elevational view of a roller assembly 20 of FIG. 1. The roller assembly 20 includes the elements discussed above, but this view further shows the gearbox 40 also including a downwardly extending rotatable drive pulley shaft 41, a drive pulley 42 rigidly mounted to the drive pulley shaft, a mounting flange 43 rigidly extending from the body of the gearbox 40, and a rigid circular locating boss 45 defined by the body of the gearbox.
Figure 3:
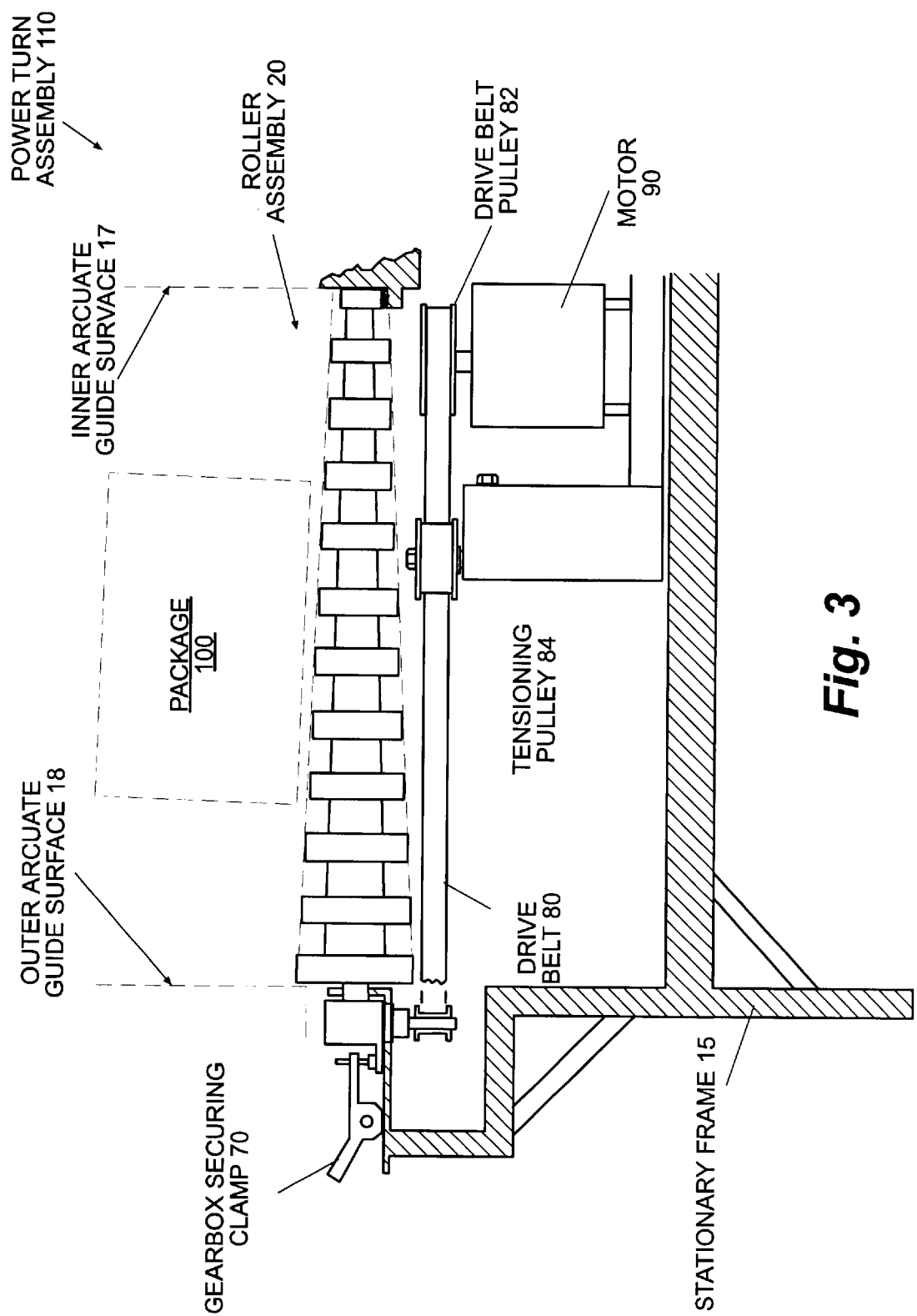
FIG. 3 is a side elevational view of the power turn assembly 10 of FIG. 1, viewing the assembly 10 in partial cross section. The power turn assembly 10 includes a stationary frame 15, which supports roller assemblies 20 such as the one shown in FIG. 3. The roller assembly 20 is shown installed relative to the stationary frame 15, and secured thereto by use of a gearbox securing clamp 70. A motor 90, which drives a belt 80, is likewise shown in FIG. 3. Inner and outer arcuate guide surfaces 17, 18, respectively are shown, which provide inner and outer guides for the typical package 100 shown generally atop the roller assembly 20. It should be understood that the inner and outer arcuate guide surfaces 17, 18, respectively can be provided by any suitable rigid supporting means, and define arcuate guide surfaces which generally follow the curved path of packages as they roll atop the power turn assembly.

The roller assemblies 20 are shown, for example, in FIGS. 1–3.

Figure 6:
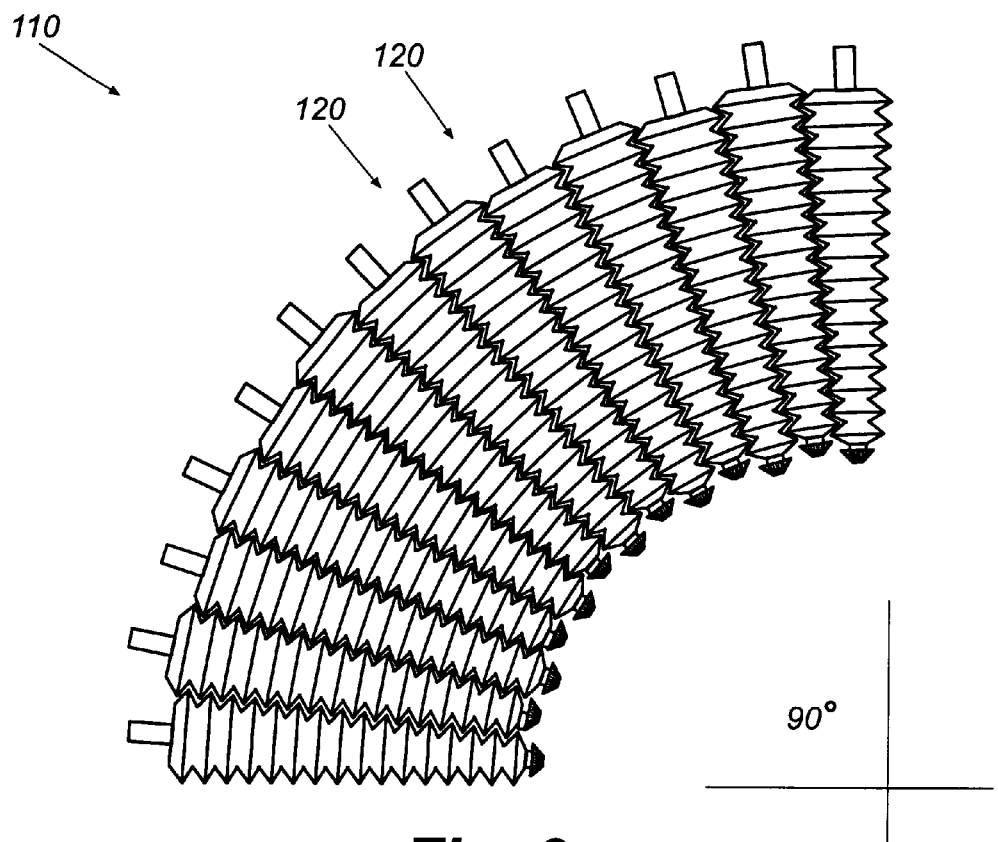
FIG. 6 is an illustrative top plan view of a second embodiment 110 of the present invention, which includes differently shaped guide rollers 120.
Figure 7:
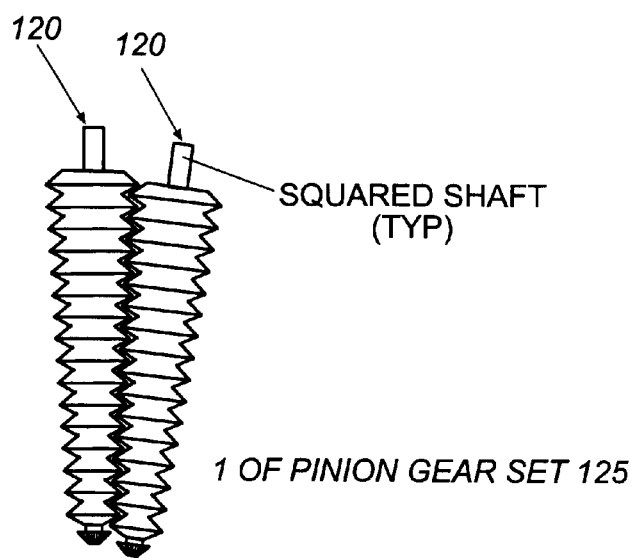
FIG. 7 is a more detailed view of the guide rollers of the embodiment shown in FIG. 6, with these guide rollers including more sharp corners at the point of contact, as opposed to the flat surfaces, shown in for example, FIG. 1.

FIG. 1 shows the power turn assembly 10 according to the present invention, which includes a plurality of roller assemblies 20. Each of the roller assemblies 20 includes an inner bearing 30, a gearbox 40, and an elongate cone-like roller 50. Each roller member 50 includes an elongate shaft 51, a plurality of protruding portions 52, and a plurality of recessed portions 53 intermediate and alternating between the protruding portions. It should be understood that only a portion of the power turn assembly 10 is shown in FIG. 1, in fact, one preferred power turn assembly according to the present invention is configured to move packages through a substantially "90 degree" path, such as generally shown also in FIG. 6.

FIG. 2 is an isolated side elevational view of a roller assembly 20 according to the present invention. The roller assembly 20 includes the elements discussed above, but this view further shows the gearbox 40 also including a drive pulley shaft 41, a drive pulley 42 rigidly mounted to the drive pulley shaft, a mounting flange 43 rigidly extending from the body of the gearbox 40, and a rigid circular locating boss 45 defined by the body of the gearbox.

FIG. 3 shows the roller assembly of FIG. 2 in its installed position within the power turn assembly 10. The power turn assembly 10 includes a stationary frame 15, which supports the roller assemblies 20. The roller assembly 20 is shown installed relative to the stationary frame 15, and secured thereto by use of a gearbox securing clamp 70.

Multiple roller assemblies 20 as shown in FIG. 1 are supported by the frame 15. Each roller assembly 20 includes an elongate cone-like conveyor roller 22, a rectangular bearing 30 mounted to the narrow, "inner" end of its conveyor roller, and a rectangular 90 degree gearbox 40 mounted to the wide, "outer", end of its conveyor roller.

It should be understood that the drive pulley of a gearbox 40 remains attached to the gearbox when the gearbox is lifted from its respective cavity.

The Rollers

Figure 8:
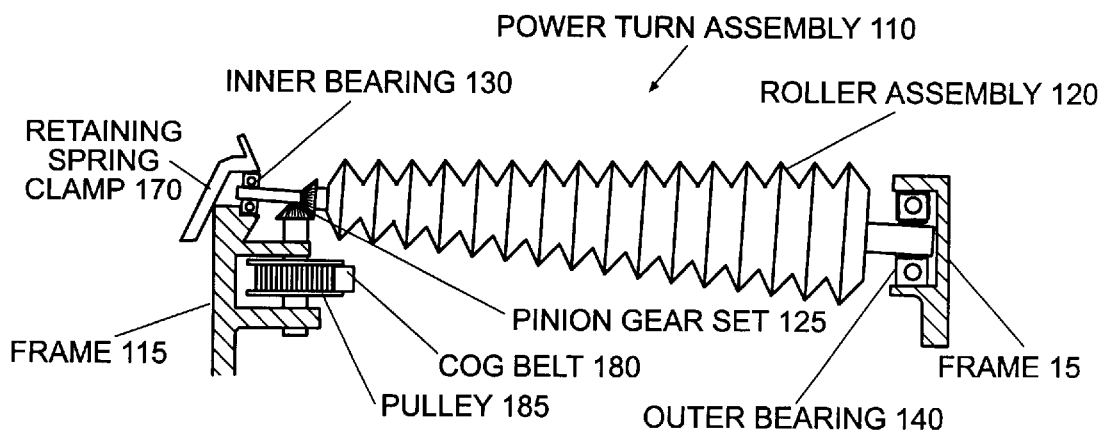
FIG. 8 is a side illustrative plan view of a portion of an alternative power turn assembly 110 according to the present invention, showing a roller assembly 120, which includes a set of pinion gears shown generally as 125, which are driven by a pulley 185 rotatably mounted relative to the frame 115, of the alternate power turn assembly 110. A retaining spring 170, mounted relative to the frame 115, is configured to detachably retain an inner bearing 130, such that movement of the spring as shown later in FIGS. 10 and 11 allows selective withdrawal of the alternate roller assembly 120 from the frame. The outer bearings 140 are likewise provided with a generally loose fit, in order to allow removal as shown in FIG. 11.

The rollers are elongate and have a general cone-like shape, defined by a plurality of protruding portions 52, and a plurality of recessed portions 53 intermediate the protruding portions. The protruding portions include generally flat circumferencial surfaces configured to contact packages 100. In an alternate configuration, elongate cone-like conveyor roller could include a plurality of alternating annular ridges and grooves encircling the elongate axis of the roller, as shown in FIG. 8, for example. The ridges of the conveyor rollers extend into the grooves of neighboring conveyor rollers to provide a generally continuous rolling surface. Other roller configurations could also be used without departing from the spirit and scope of the present invention. A shaft 51 extends along the center of each of the rollers.

The Inner Bearing 24

As noted above, each roller assembly 20 includes a rectangular bearing 24 mounted to the narrow, "inner" end of its conveyor roller 22. As noted in further detail below, this rectangular bearing 24 removably fits within an upwardly-directed stationary cavity defined by the frame 15 of the apparatus 10, such that the inner bearing is captured at least with respect to sideward and downward movement when the clamp is tensioned.

It may be understood that the inner bearings 30 are maintained within their mounting positions by gravity as well as the use of rubber, either on the surface of the bearing housing or on the frame of the apparatus, to provide some friction between the housings of the inner bearing and the frame. Such rubber also reduces vibration and the noise associated therewith.

The Gearbox

Each roller assembly 20 has mounted to its wider, "outer", end a rectangular right angle (a.k.a "90 degree") gearbox 40. Each gearbox 40 includes a vertical input shaft, referenced as a "drive pulley shaft 41" that extends downwardly from the gearbox and carries a drive pulley 42. Each gearbox further includes a horizontal output shaft that extends horizontally from the side of the gearbox, and serves as the roller shaft 51.

Rotation of the drive pulley 42 causes rotation of the drive pulley shaft, which through the gearbox causes rotation of the roller shaft 51.

As shown in FIG. 2, each gearbox includes a circular, downwardly-facing, locating boss 45 which fits snugly within the hole 13 (shown in FIG. 5), such that when the clamp 70 is secured as shown in FIG. 3, the gearbox is captured, thus similarly capturing its associated roller assembly 20.

The Frame

The power turn assembly 10 includes a base frame 15, which is substantially stationary and rigid. The frame 15 serves to support the roller assemblies for their desired rotation, and also provides support for other elements described herein. As shown in Fig, 3, the frame 15 also includes an arcuate outer guide surface 18, and an arcuate outer guide surface 18. The guides 17, 18, function as side rails that keep objects being conveyed from sliding off of the continuous rolling surface provided by the conveyor rollers. The outer guide member defining the arcuate outer guide surface 18 can be is friction-fit to the frame 15 by virtue of a tongue and groove arrangement, and rods over which a portion of the outer guide is slid.

The frame 15 also includes multiple inner bearing receptacles, each of which has an upwardly oriented opening for receiving the rectangular inner bearing 30 of each of the roller assemblies 20. Each of the bearing receptacles defines a rectangular cavity that is complementary to the corresponding rectangular bearing so that each bearing can be easily dropped into and lifted from its respective cavity.

Figure 5:
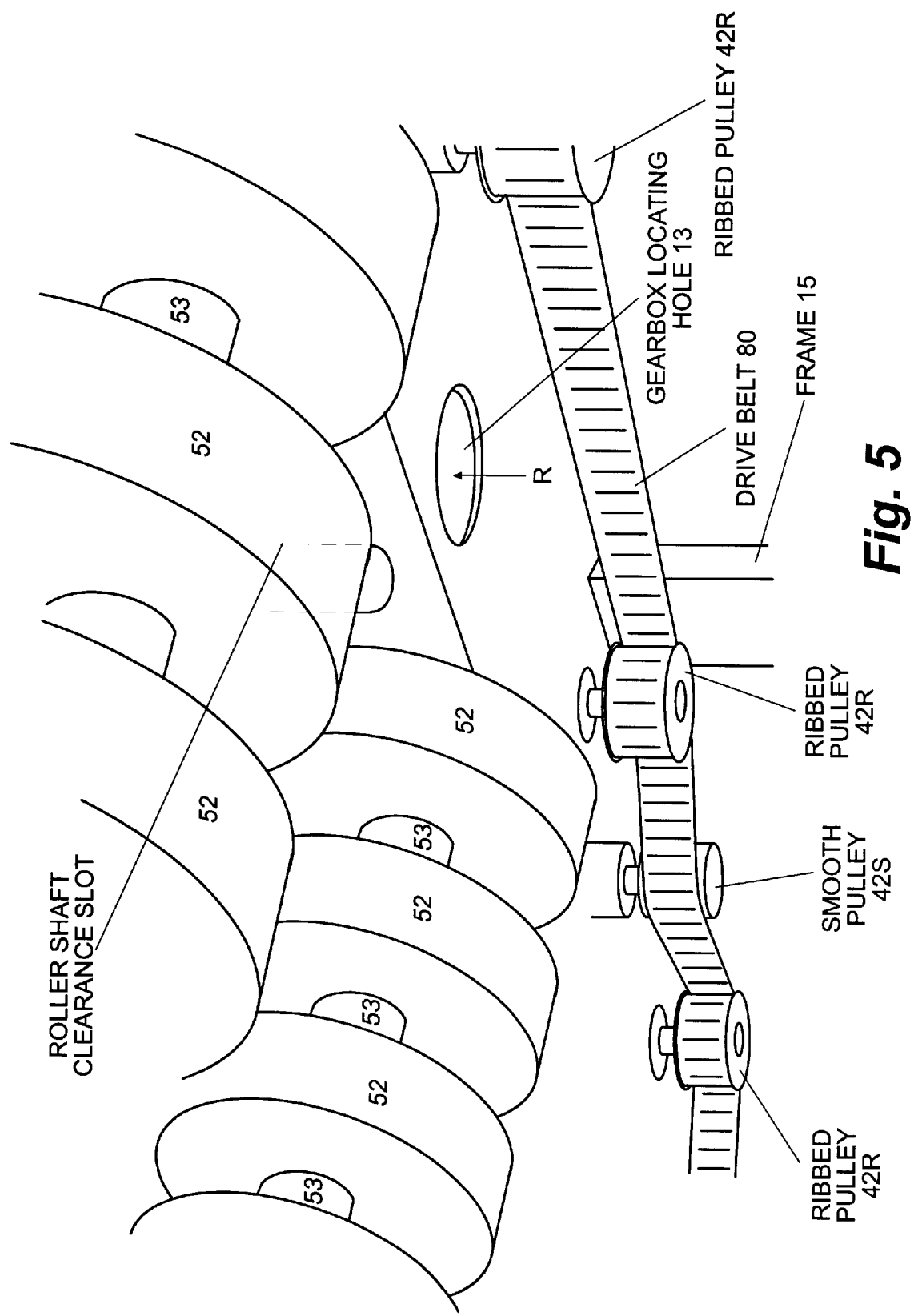
FIG. 5 is an underside pictorial view of a portion of the power turn assembly 10 according to the present invention. This view is much as one might see if looking up and outward from beneath the plane of the conveying surface. Such a view shows a portion of two roller assemblies, three ribbed pulleys 42 are in place, one smooth pulley 42S in place, and one open gearbox locating hole 13. This hole 13 is left vacant because one roller assembly which is normally positioned between the two roller assemblies shown in the drawings has been removed. This roller assembly has a "smooth" pulley 42S.

Similarly, the frame 15 also includes multiple gearbox receptacles, each of which has an upwardly oriented circular opening or through hole 13 for receiving a downwardly-directed boss 45 of the gearboxes 40. An upwardly-directed slot 12 is also shown in FIG. 5 which allows for clearance for the shaft 51 of missing roller assembly so that each gearbox can be easily dropped into and lifted its place in the frame 15.

A manual latch or clip 70 is provided which allows for the gearboxes (and the roller assemblies 20 to be secured relative to the frame 15. The manual latches can be easily unlatched to release the gearboxes from their gearbox receptacles.

It should be understood that the drive pulley of a gearbox 40 remains attached to the gearbox when the gearbox is lifted from its respective cavity. While a gearbox is properly within its gearbox receptacle, the drive shaft and associated drive pulley extend downward from the gearbox.

The Drive Train

Figure 4:
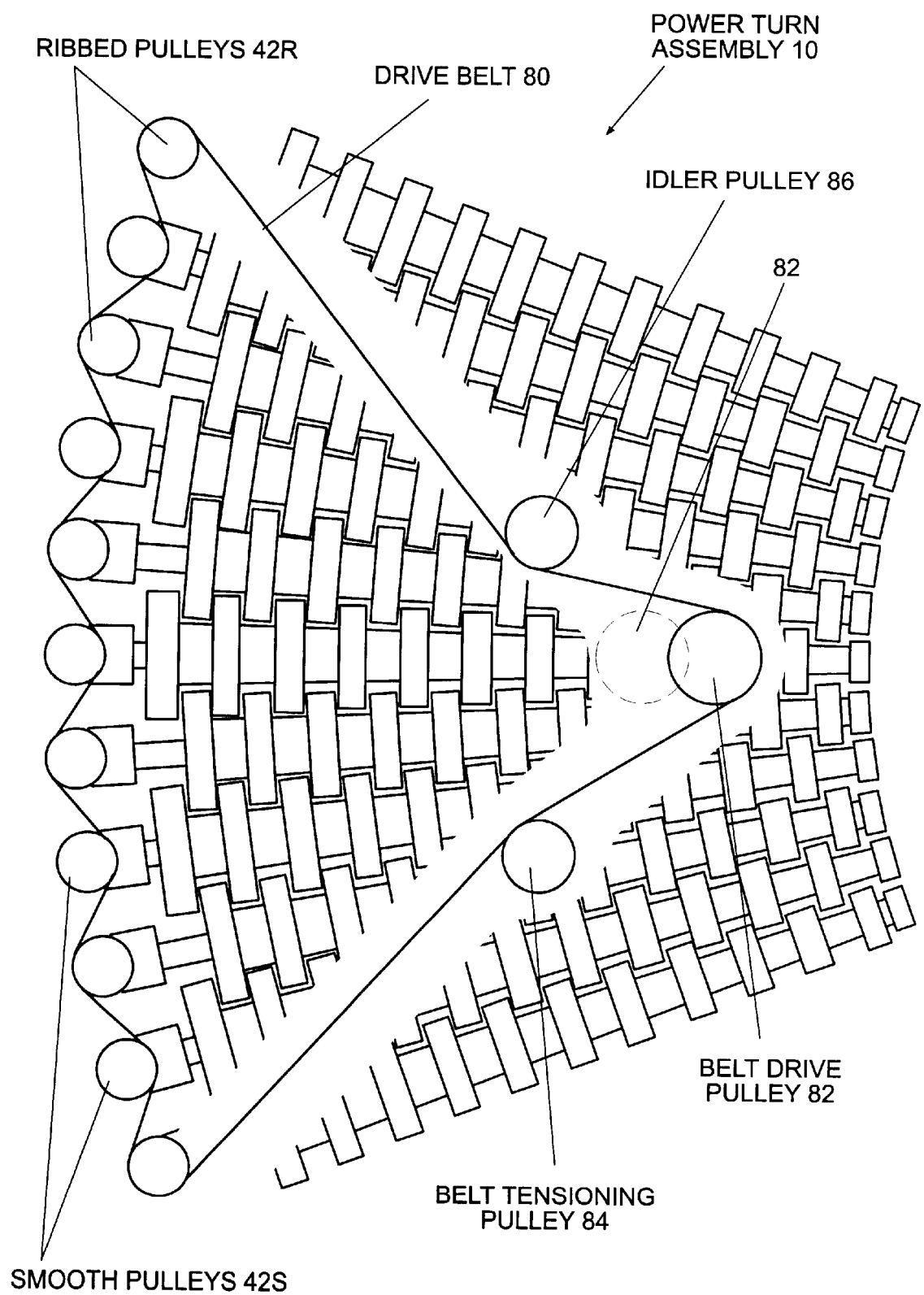
FIG. 4 is a top illustrative plan view of a portion of the power turn assembly, which shows the drive belt path of the drive belt 80 which drives all the roller assemblies 20. This drive belt moves along a path which is defined by pulleys 42S, 42R, an idler pulley 122, a belt drive pulley 120, and a belt tip tensioning pulley 124. As may be understood, the belt drive pulley is configured for movement from its position shown in solid line to its position shown in dotted line, in order to allow for some "slack" to be provided in the drive belt for purposes of replacing the drive belt 80, the individual roller assemblies 20, or both.

As noted above, while a gearbox is properly within its gearbox receptacle, the drive shaft 41 and associated drive pulley extend downwardly from the gearbox 40 as shown in FIG. 2. Referring now to FIG. 4, a drive belt 80 is engaged to and drives all of the drive pulleys so that the conveyor rollers rotate. The drive belt 80 defines a serpentine arrangement with respect to the drive pulleys. Every other of the pulleys 42 is a "ribbed" pulley 42R, which is configured to mate with a single-sided cogged "timing-type" belt 80. The other pulleys 42S are smooth-sided pulleys, which frictionally engage the smooth side of the belt (opposite the cogged side). Reference is briefly made to FIG. 5, which shows in some detail the serpintine interaction of the belt 80, the ribbed pulleys 42R, and the smooth pulley 42S. Every other gearbox 40 is fitted with "reverse gearing" so that all of the conveyor rollers rotate in the same direction.

A motor 90 (see FIGS. 3 and 4) drives the drive belt 80 and is mounted to the base 15 beneath the conveying path. The motor 90 is mounted on a carriage that can be moved to increase and decrease the tension of the drive belt, such that the drive pulley 82 can be moved between the position shown in solid line in FIG. 4 to the position shown as 82' in dotted line.

In one configuration, the surface speed of the conveyor turn, measured in the middle of the path, is approximately 500 feet/min., although other speeds are contemplated.

Installation and Removal

A roller assembly 20 can easily be removed from and replaced within the power turn assembly without disturbing the other roller assemblies and with minimal disturbance to the drive belt 80. A roller assembly 20 is removed by first turning off the motor 90 and then moving the drive pulley 82 to the position shown in dotted line as 82' in FIG. 3 to decrease the tension of the drive belt.

In one configuration, the outer guide (not shown) defining the outer arcuate guide surface must be removed from the frame in order to remove the roller assemblies. The outer guide must be removed because the outer guide extends above the output shaft of each of the gearboxes.

After the belt 80 is loosened and the outer guide is removed, the latch 70 associated with the gearbox of the roller assembly to be removed is unlatched. Due to the cooperative nature of the frame, bearings and gearboxes, a roller assembly can then be lifted from the frame. The steps are reversed to reinstall the roller assembly.

Advantages of First Embodiment

It may be seen that in the first embodiment the untensioned drive belt does not interfere with the removal or installation of conveyor rollers. This is the result of a drive belt that extends in a horizontal plane and engages drive pulleys that rotate about vertical axes and are connected by 90 degree gear boxes to horizontally extending conveyor rollers. The drive belt cooperates with the drive pulleys and gearboxes to hold the conveyor rollers to the conveyor frame while the drive belt is tensioned, and easy removal of the conveyor roller assemblies is allowed while the drive belt is untensioned. Furthermore, receptacles that receive the gearboxes and bearings at the opposite ends of the conveyor rollers extend vertically and define upwardly oriented openings, so that when the drive belt is untensioned the conveyor roller assemblies can be vertically lifted from or vertically dropped into their respective positions in the conveyor system.

It should be understood that the configuration described above includes the use of at least two immediately adjacent powered conveyor rollers, and in fact FIG. 1 shows 11 immediately adjacent powered conveyor rollers. The applicant's use of the term "immediately adjacent" is meant to mean that there are no idling conveyor rollers within a group of "immediately adjacent" rollers.

Second Embodiment—General Construction and Operation

Reference is generally made to FIGS. 6–11 in describing the general construction of a second embodiment of the present invention, being a power turn assembly 110.

As noted above, FIGS. 6 and 7 show differently shaped roller assemblies 120, with these guide rollers including more sharp corners at the point of contact, as opposed to the flat surfaces shown in, for example, FIG. 1.

Referring now also to FIG. 8, shown is the power turn assembly 110 according to the present invention, including a plurality of roller assemblies 120. Each roller assembly is driven by use of a pinion gear set shown generally as 125. One pinion gear is rigidly attached to the roller shaft, and the other pinion gear is rigidly attached to a stub shaft rotatably mounted to the frame 115 of the power turn assembly 110. This stub shaft also rigidly supports a cog belt pulley 185. The pulley 185 is driven by a belt 180.

Figure 10:
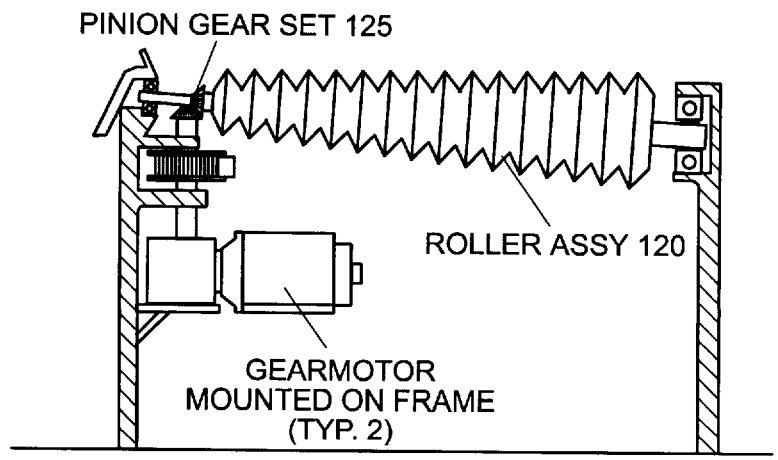
FIGS. 10 and 11 are illustrative side elevational cross sectional views showing the general removal process for the alternate roller assembly 120. As may be seen, when the release spring 170 is pulled backwardly, the inner bearing 130 is free to be moved upwardly, such that the pinion pair set 125 can be disengaged, and the roller assembly 120 can be removed from the outer bearing. In one preferred embodiment, the outer bearing can include a square shaft with a loose fit.
Figure 11:
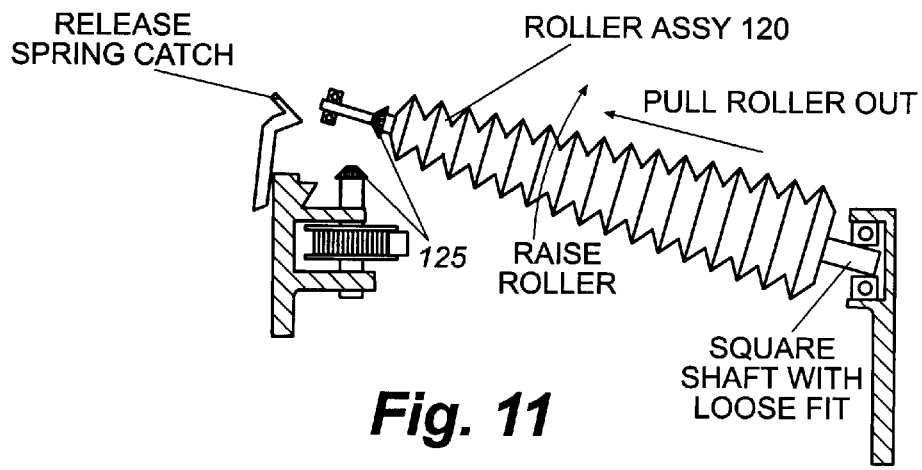

A retaining clamp or spring 170 is mounted relative to the frame 115 and is configured to detachably retain an inner bearing 130, such that movement of the spring as shown in FIGS. 10 and 11 allows selective withdrawal of the alternate roller assembly 120. Each outer bearing 140 of each roller assembly 120 is provided with a generally loose fit, in order to allow removal as shown in FIG. 1.

Figure 9:
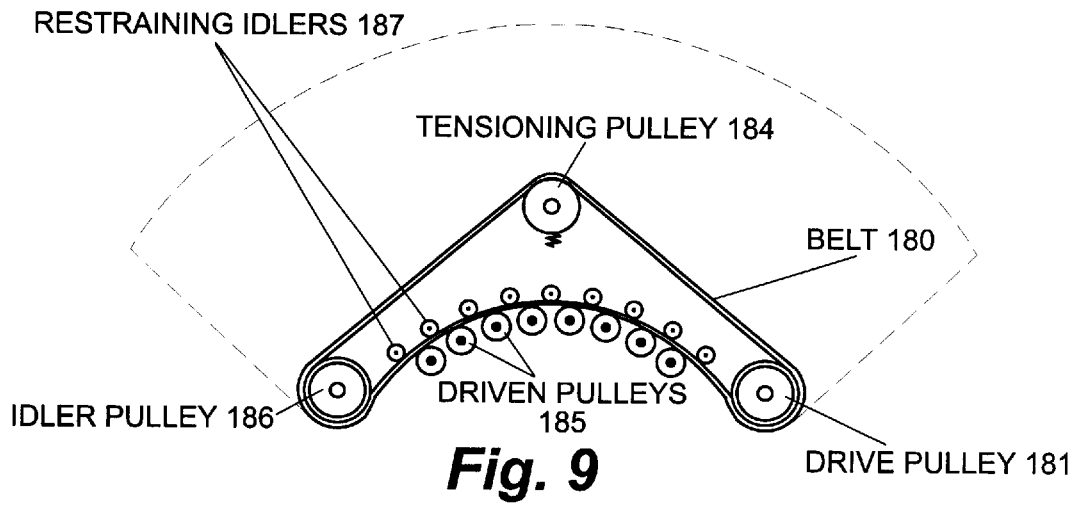
FIG. 9 is a top elevational isolated view of the drive belt 180 and associated rollers used in the alternate power turn assembly 110. The rollers include a drive pulley 181, a tensioning pulley 184, an idler pulley 186, restraining idlers 187, and the driven roller pulleys 185 which are the same pulleys which are shown in for example, FIG. 8.

Referring now to FIG. 9, the drive belt path of the power turn assembly 110 is shown, showing the belt and associated pulleys (a.k.a. "sprockets" due to their ribbed nature) used in the power turn assembly 110. The rollers include a drive pulley 181, a tensioning pulley 184, an idler pulley 186, restraining idlers 187, and the driven roller pulleys 185 which are the same pulleys which are shown in, for example, FIG. 8.

FIGS. 10 and 11 show the general removal process for the alternate roller assembly 120. As may be seen, when the release spring 170 is pulled backwardly, the outer bearing 140 is free to be moved upwardly, such that the pinion gear set 125 can be disengaged, and the roller assembly 120 can be removed from the outer bearing. In one preferred embodiment, the outer bearing can include a square shaft with a loose fit.

Third Embodiment

Figure 12:
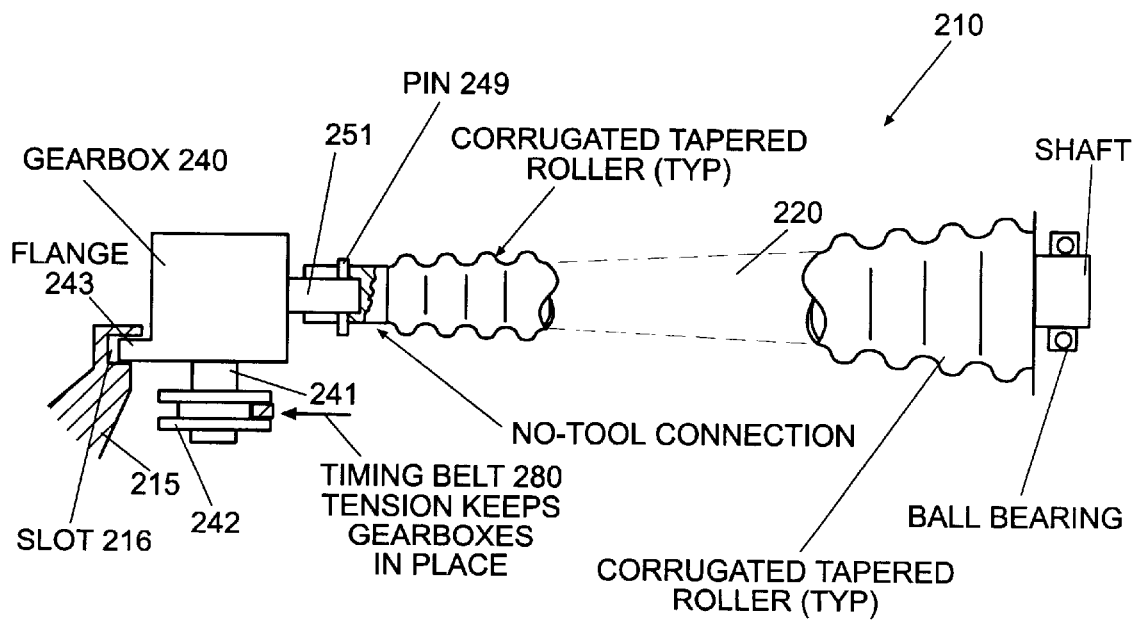
FIG. 12 is side elevational illustrative view of a third preferred power turn assembly 210 configuration according to the present invention, in which the timing belt tension keeps the gearboxes, and thus the rollers, in place. The timing belt 280 tension is configured to pull leftwardly (as the figure is viewed) on the gearbox 240, maintaining a flange 243 extending from the gearbox within an associated slot 216 defined by the frame 215. A pin-slot connection is provided intermediate between a transverse pin in the output shaft of the gearbox 240 and a slot (not shown) in the shaft of the roller assembly 220. To remove the roller assembly 220 from its mounted position, the timing belt 280 is removed, the gearbox 240 is moved relatively rightwardly, (which is accommodated by the relative sloppy pin/slot configuration), and then the gearbox can be moved upwardly as the figure is moved. The outer bearing will likewise will need to be somewhat "sloppy" in order to allow such pivoting while still allowing for adequate service.
Figure 13:
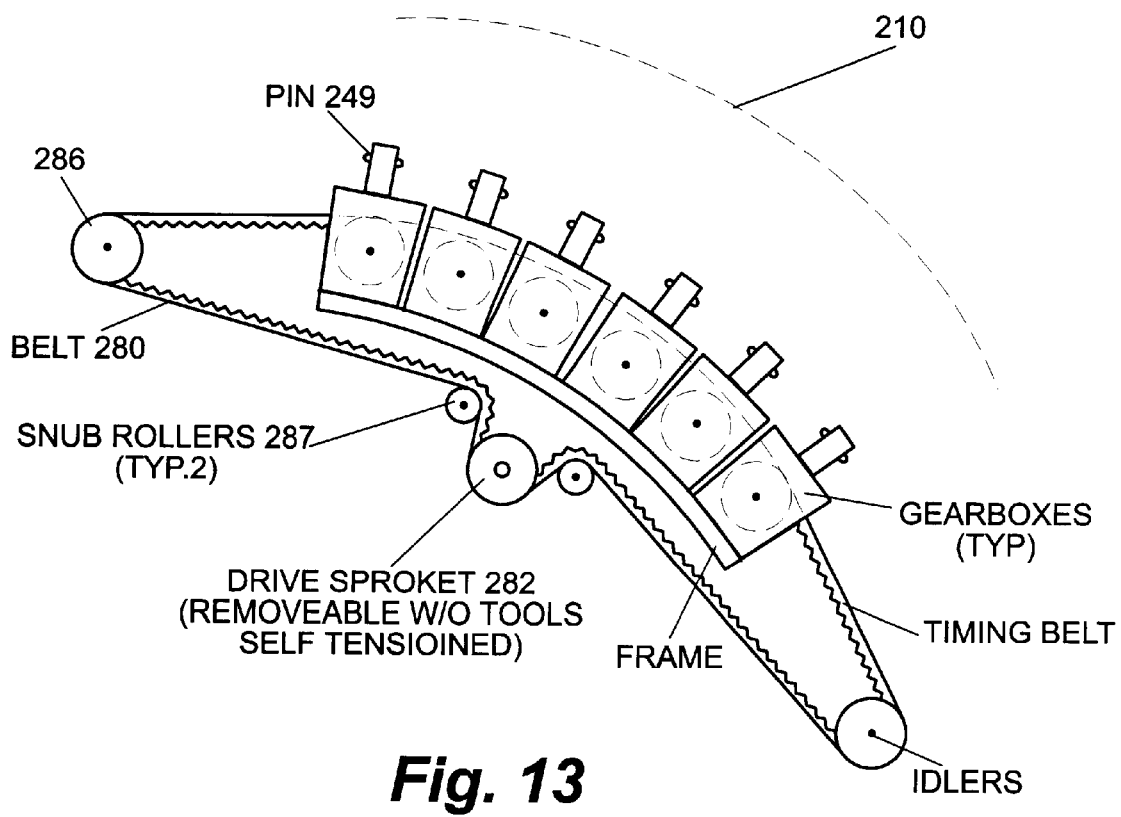
FIG. 13 illustrates the drive belt configuration for the third embodiment 210.
Figure 14:
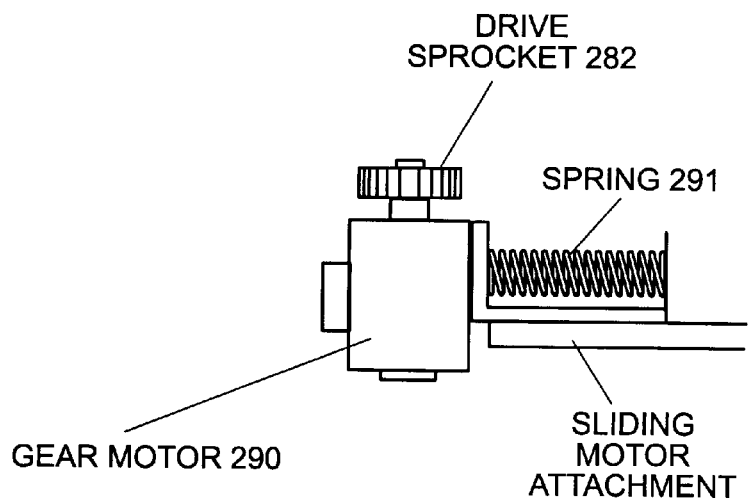
FIG. 14 shows a side elevational view showing the spring-biased mounting of the motor 290 relative to the frame.

Reference is generally made to FIGS. 12–14 in describing the general construction of a third embodiment of the present invention, being a power turn assembly 210.

FIG. 12 is side elevational, illustrative view of the power turn assembly 210, in which the timing belt tension keeps the gearboxes, and thus the rollers, in place. The timing belt 280 tension is configured to pull leftwardly (as the figure is viewed) on the gearbox 240 maintaining a flange 243 extending from the gearbox within an associated slot 216 defined by the frame 215. A pin/slot connection is provided intermediate the output shaft of the gearbox 240 and a roller assembly 220. To remove the roller assembly 220 from its mounted position, the timing belt 280 is removed, the gearbox 240 is moved relatively rightwardly, (which is accommodated by the relative sloppy pin/slot configuration), and then the gearbox can be moved upwardly as the figure is moved. The outer bearing will likewise will need to be somewhat "sloppy" in order to allow such pivoting while still allowing for adequate service.

FIG. 13 illustrates the drive belt configuration for the third embodiment, which includes a drive belt 280, idler pulleys 286, and a self-tensioned drive pulley 282.

FIG. 14 shows a side elevational view showing the spring-biased mounting of the gear motor 290 driving the drive pulley 282. As may be seen, a spring as known in the art is provided to provide spring bias as needed to keep the belt taut.

Fourth Embodiment

Figure 15:
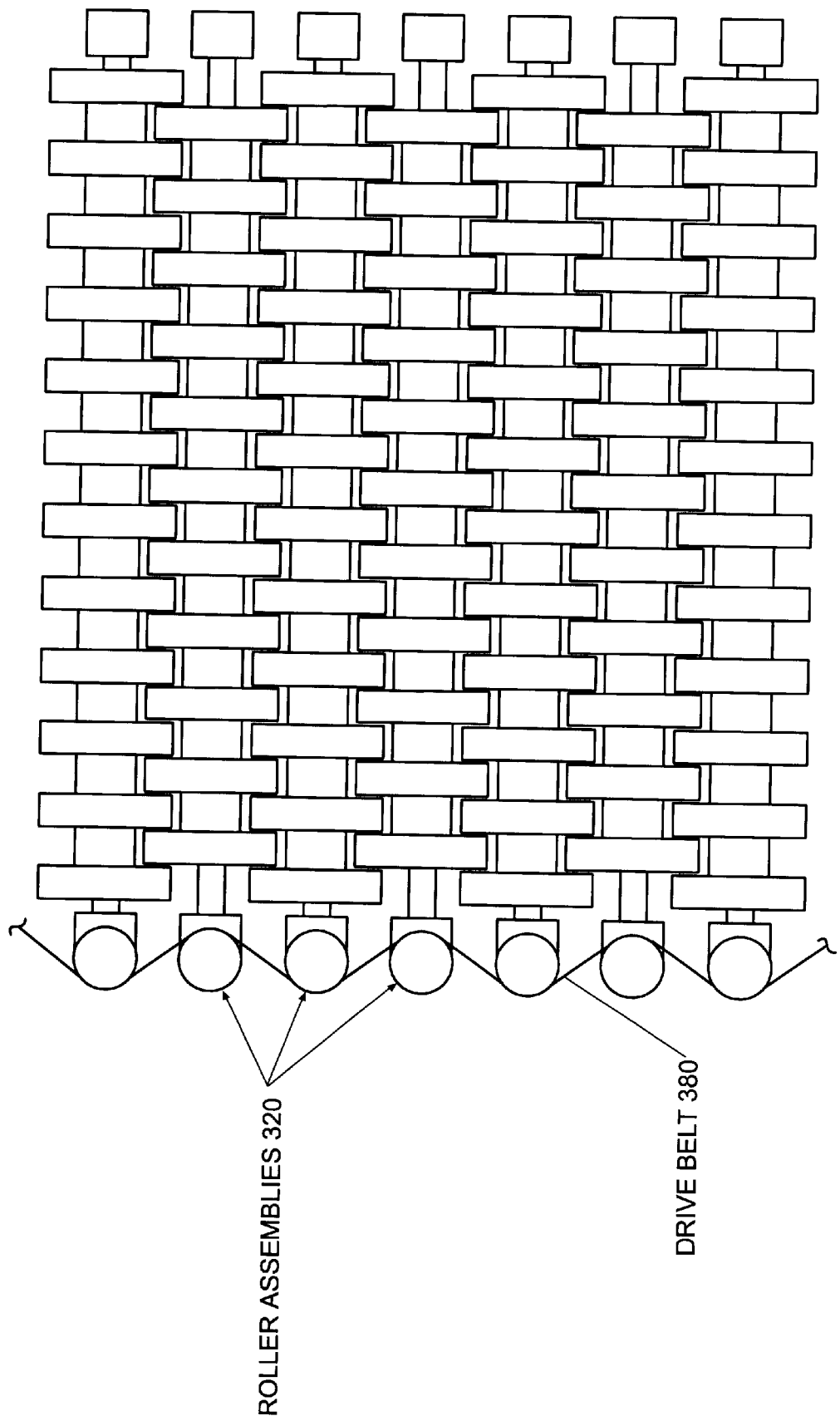
FIG. 15 shows an alternate configuration in which the invention is used within a straight conveyor section, as compared to a curved section. This configuration includes a drive belt 380 associated with roller assemblies 320. It may be seen that the roller assemblies are not tapered in this straight-line configuration.

FIG. 15 shows an alternate configuration in which the invention is used within a straight conveyor section, as compared to a curved section. This configuration includes a drive belt 380 associated with roller assemblies 320. It may be seen that the roller assemblies are not tapered in this straight-line configuration, but otherwise the straight configuration is similar to the curved configuration.

Conclusion

Therefore it may be seen that the present invention overcomes deficiencies in the prior art by providing a conveying apparatus which provides a power turn function, and which can be readily and easily serviced with a minimum of downtime.

While this invention has been described in specific detail with reference to the disclosed embodiments, it will be understood that many variations and modifications may be effected within the spirit and scope of the invention as described in the appended claims.

I claim:

1. A conveying apparatus for conveying items, comprising:

a frame;

first, second, and third conveyor rollers rotatably mounted relative to said frame said first, second, and third conveyor rollers being immediately adjacent and configured to combine to define a conveying path lying substantially in a conveying plane;

first, second and third immediately adjacent pulleys rotatably mounted relative to said frame;

first, second, and third immediately adjacent gearboxes each having an inlet and an outlet end and configured to cause rotation of said immediately adjacent first, second, and third conveyor rollers, respectively upon rotation of said first, second, and third conveyor pulleys, respectively; and an endless drive belt lying substantially in a horizontal plane and engaging said first, second, and third pulleys in a serpentine manner such that items can be conveyed along said conveying path.

2. The conveying apparatus of claim 1, wherein said serpentine manner is such that the path of said belt around weaves back and forth through said first, second and third immediately adjacent pulleys such that for a given belt movement direction, said first and third pulleys rotate in an opposite direction to that of said second pulley.

3. The conveying apparatus of claim 1, wherein said first, second and third pulleys lie along a curved path having a substantially identified radius of curvature, such that a powered turn conveyor is provided.

4. The conveying apparatus of claim 1, wherein said first and second conveyor rollers each include intermeshing protruding portions and recessed portions, and wherein said protruding portions include flat circumferencial contact portions for supporting said items while being conveyed.

5. The conveying apparatus of claim 1, wherein said first and second conveyor rollers each include intermeshing protruding portions and recessed portions, and wherein said protruding portions include annular ridge portions for supporting said items while being conveyed.

6. The conveying apparatus of claim 1, wherein said conveying plane of said conveying path is a substantially horizontal plane.

7. The conveying apparatus of claim 6, wherein said horizontal plane of said endless drive belt being below said conveying plane of said conveying path.

8. The conveying apparatus of claims 1, wherein said serpentine manner is such that the path of said belt around weaves back and forth through said first, second and third immediately adjacent pulleys such that for a given belt movement direction, said first and third pulleys rotate in an opposite direction to that of said second pulley.

9. The conveying apparatus of claim 8, wherein said first, second and third pulleys lie along a curved path having a substantially identified radius of curvature, such that a powered turn conveyor is provided.

10. The conveying apparatus of claim 8, wherein said first, second and third pulleys lie along a substantially straight path.

11. A conveying apparatus for conveying items, comprising:

a frame;

first, second, and third conveyor rollers rotatably mounted relative to said frame said first, second, and third conveyor rollers being immediately adjacent and configured to combine to define a conveying path lying substantially in a conveying plane;

first, second and third immediately adjacent pulleys rotatably mounted relative to said frame;

first, second, and third immediately adjacent gearboxes each having an inlet shaft attached to a corresponding pulley and an outlet shaft attached to a corresponding conveyor roller, said gearboxes configured to cause rotation of said immediately adjacent first, second, and third conveyor rollers, respectively upon rotation: of said first, second, and third conveyor pulleys, respectively, and said gearboxes also having their inlet and outlet shafts at substantially ninety (90) degree relationships; and an endless drive belt lying substantially in a horizontal plane and engaging said first, second, and third pulleys in a serpentine manner such that items can be conveyed along said conveying path.

12. The conveying apparatus of claims 11, wherein said serpentine manner is such that the path of said belt around weaves back and forth through said first, second and third immediately adjacent pulleys such that for a given belt movement direction, said first and third pulleys rotate in an opposite direction to that of said second pulley.

13. The conveying apparatus of claim 11, wherein said first, second and third pulleys lie along a substantially straight path.

14. The conveying apparatus of claim 11, wherein said first, second and third pulleys lie along a curved path having a substantially identified radius of curvature, such that a powered turn conveyor is provided.

15. The conveying apparatus of claim 11, further comprising first, second, and third bearing assemblies for supporting said first, second, and third conveyor rollers, respectively, for rotation relative to said frame, and wherein said frame of said conveying apparatus includes upwardly-directed holes configured for accepting a portion of said bearing assemblies.

16. The conveying apparatus of claims 11, wherein adjacent gearboxes are reversed relative to each other, in that rotation of their pulleys in opposite directions causes rotation of the conveyor rollers in a common direction.

17. The conveying apparatus of claim 16, wherein said first, second and third pulleys lie along a curved path having a substantially identified radius of curvature, such that a powered turn conveyor is provided.

18. The conveying apparatus of claim 16, wherein said first, second and third pulleys lie along a substantially straight path.

19. The conveying apparatus of claim 11, wherein said frame of said conveying apparatus includes upwardly-directed holes configured for accepting a portion of said gearboxes.

20. The conveying apparatus of claim 19, further comprising first, second, and third bearing assemblies for supporting said first, second, and third conveyor rollers, respectively, for rotation relative to said frame, and wherein said frame of said conveying apparatus includes upwardly-directed holes for accepting at least a portion of said first, second, and third bearing assemblies.

21. The conveying apparatus of claim 20, further comprising first, second, and third bearing latch assemblies for detachably attaching the housings of said first, second, and third gearboxes relative to said frame and configured for accepting a portion of said bearing assemblies.

22. The conveying apparatus of claim 19, further comprising first, second, and third bearing latch assemblies for detachably attaching the housings of said first, second, and third gearboxes relative to said frame.

23. A conveying apparatus for conveying items, comprising:
a frame defining a plurality of holes all being generally directed upwardly;
first, second, and third conveyor rollers rotatably mounted relative to said frame said first, second, and third conveyor rollers being immediately adjacent and configured to combine to define a conveying path lying substantially in a conveying plane;
first, second and third immediately adjacent pulleys rotatably mounted relative to said frame;
first, second, and third immediately adjacent gearboxes each having an inlet shaft attached to a corresponding pulley and an outlet shaft attached to a corresponding conveyor roller, said gearboxes configured to cause rotation of said immediately adjacent first, second, and third conveyor rollers, respectively upon rotation of said first, second, and third conveyor pulleys, respectively, and said gearboxes also having their inlet and outlet shafts at substantially ninety (90) degree relationships; and
an endless drive belt lying substantially in a horizontal plane and engaging said first, second, and third pulley in a serpentine manner such that the path of said belt around weaves back and forth through said first, second and third immediately adjacent pulleys such that for a given belt movement direction, said first and third pulleys rotate in an opposite direction to that of said second pulley,
said upwardly-directed holes in said frame configured to accept a portion of said gearboxes,
said horizontal plane of said endless drive belt being below said conveying plane of said conveying surface.

24. The conveying apparatus of claim 23, wherein said first, second and third pulleys lie along a curved path having a substantially identified radius of curvature, such that a powered turn conveyor is provided.

25. The conveying apparatus of claim 23, wherein said first, second and third pulleys lie along a substantially straight path.

26. The conveying apparatus of claim 23, further comprising first, second, and third bearing assemblies for supporting said first, second, and third conveyor rollers, respectively, for rotation relative to said frame, and wherein said frame of said conveying apparatus includes upwardly-directed holes configured for accepting a portion of said bearing assemblies.

27. The conveying apparatus of claim 23, wherein said frame of said conveying apparatus includes upwardly-directed holes configured for accepting a portion of said gearboxes.

28. The conveying apparatus of claim 27, further comprising first, second, and third bearing latch assemblies for detachably attaching the housings of said first, second, and third gearboxes relative to said frame.

29. The conveying apparatus of claim 27, further comprising first, second, and third bearing assemblies for supporting said first, second, and third conveyor rollers, respectively, for rotation relative to said frame, and wherein said frame of said conveying apparatus includes upwardly-directed holes for accepting at least a portion of said first, second, and third bearing assemblies.

30. The conveying apparatus of claim 29, further comprising first, second, and third bearing latch assemblies for detachably attaching the housings of said first, second, and third gearboxes relative to said frame and configured for accepting a portion of said bearing assemblies.

31. A conveying apparatus for conveying items, comprising:
a frame defining a plurality of holes all being generally directed upwardly;
first, second, and third conveyor rollers rotatably mounted relative to said frame said first, second, and third conveyor rollers being immediately adjacent and configured to combine to define a conveying path lying substantially in a conveying plane;
first, second and third immediately adjacent pulleys rotatably mounted relative to said frame;
first, second, and third immediately adjacent gearboxes each having an inlet shaft attached to a corresponding pulley and an outlet shaft attached to a corresponding conveyor roller, said gearboxes configured to cause rotation of said immediately adjacent first, second, and third conveyor rollers, respectively upon rotation of said first, second, and third conveyor pulleys, respectively, and said gearboxes also having their inlet and outlet shafts at substantially ninety (90) degree relationships; and
an endless drive belt lying substantially in a horizontal plane and engaging said first, second, and third pulley in a serpentine manner such that items can be conveyed along said conveying path and such that the path of said belt around weaves back and forth through said first, second and third immediately adjacent pulleys such that for a given belt movement direction, said first and third pulleys rotate in an opposite direction to that of said second pulley, said endless belt having a flat cross section and two sides each configured to contact alternate adjacent pulleys,
said upwardly-directed holes in said frame configured to accept a portion of said gearboxes,
said horizontal plane of said endless drive belt being below said conveying plane of said conveying surface.

32. The conveying apparatus of claim 31, wherein said endless belt is cogged on one side, and wherein every other adjacent pulley is cogged to engage said cogged side of said endless belt.

* * * * *